(12) United States Patent
Dreisilker et al.

(10) Patent No.: US 7,077,383 B1
(45) Date of Patent: Jul. 18, 2006

(54) BUTTERFLY VALVE FOR CONTROLLING A GAS PRESSURE

(75) Inventors: Ralf Dreisilker, Velbert (DE); Bernhard Petri, Mainz-Kastel (DE)

(73) Assignee: Nord-Micro AG & Co. OHG, Frankfurt/Main (DE)

( * ) Notice: Subject to any disclaimer, the term of this patent is extended or adjusted under 35 U.S.C. 154(b) by 0 days.

(21) Appl. No.: 10/523,288

(22) PCT Filed: Aug. 14, 2002

(86) PCT No.: PCT/EP02/09144

§ 371 (c)(1),
(2), (4) Date: Feb. 3, 2005

(87) PCT Pub. No.: WO2004/018911

PCT Pub. Date: Mar. 4, 2004

(51) Int. Cl.
*F16K 1/22* (2006.01)

(52) U.S. Cl. .................................. 251/305; 251/367
(58) Field of Classification Search ................ 251/305, 251/306, 367
See application file for complete search history.

(56) References Cited

U.S. PATENT DOCUMENTS

| | | | | |
|---|---|---|---|---|
| 2,058,996 A | * | 10/1936 | Kollberg | 251/306 |
| 2,934,312 A | * | 4/1960 | Stevens | 251/306 |
| 3,059,897 A | * | 10/1962 | Jensen | 251/306 |
| 3,578,287 A | * | 5/1971 | Salerno et al. | 251/306 |
| 3,627,261 A | * | 12/1971 | Ludeman | 251/305 |
| 3,837,616 A | * | 9/1974 | Castriota-Scanderberg | 251/306 |
| 4,327,765 A | * | 5/1982 | Wilson et al. | 251/306 |
| 5,465,756 A | * | 11/1995 | Royalty et al. | 251/305 |
| 5,876,015 A | * | 3/1999 | Schaeffer et al. | 251/305 |

* cited by examiner

*Primary Examiner*—John Bastianelli
(74) *Attorney, Agent, or Firm*—Stephen B. Salai, Esq.; Brian B. Shaw, Esq.; Harter, Secrest & Emery LLP

(57) ABSTRACT

A butterfly valve for controlling a gas pressure, in particular inside a cabin of an aircraft, comprises a valve housing (10) having a longitudinal axis (11), a shaft (20) having a rotation axis (21), and a closure member (30) connected to the shaft (20). The closure member (30) is pivotally mounted in the valve housing (10) for rotation about the rotation axis (21) between an open position and a closed position. Moreover, the closure member (30) consists of a first disk (40) and a complementary second disk (50) which abut against each other. The first disk (40) and the second disk (50) are symmetrically arranged with regard to a symmetric axis (31) extending at a predetermined angle of inclination to the rotation axis (21). Such a butterfly valve ensures a restricted cross-sectional area of the valve housing (10), even if breaking of the closure member (30) occurs.

14 Claims, 3 Drawing Sheets

BUTTERFLY VALVE FOR CONTROLLING A GAS PRESSURE

BACKGROUND OF THE INVENTION

The present invention generally relates to a butterfly valve controlling a gas pressure and more particularly to a butterfly valve for controlling a gas pressure inside the cabin of an aircraft.

Butterfly valves are normally used for controlling the flow rate of a liquid or gaseous fluid. Conventional butterfly valves comprise to this end a closure member positioned in a valve housing for rotation about a rotation axis defined by a shaft. Typically, the closure member is configured as a disk which is rotated by the shaft between an open position allowing the fluid to flow through the valve housing and a closed position preventing the fluid from flowing through the valve housing. The shaft is driven by a torque usually applied by an external actuator, such as an electric motor.

Especially in the aviation industry, butterfly valves are employed for controlling the air pressure inside the cabin of an aircraft, as disclosed in U.S. Pat. No. 5,881,995. The flow rate of the air circulating in the cabin and, as a result, the air pressure in the cabin are influenced by the opening position of the closure member. Since air is a compressible fluid, a butterfly valve controlling the air pressure is subject to undesired effects such as vibrations, wear and noise. For example, a high pressure or a high speed flow rate of the air generates aerodynamic throttling over a wide range of opening positions resulting in an adverse state of tension in the closure member. This state of tension may effect damages of the closure member such as a crack. A spreading crack may have the consequences of breaking the closure member and, thereby, releasing a cross-sectional area of the valve housing which leads to a sudden and dangerous loss of pressure.

SUMMARY OF THE INVENTION

The object of the present invention is to provide a butterfly valve which ensures a restricted cross-sectional area of the valve housing even if a breaking of the closure member occurs.

The above object can be achieved in accordance with the present invention by a butterfly valve having the features of the following disclosed invention. Thus, the butterfly valve according to the present invention comprises a valve housing having a longitudinal axis and defining a flow path for a gas along the longitudinal axis, a shaft having a rotation axis, and a closure member connected to the shaft. The closure member is pivotally mounted in the valve housing for rotation about the rotation axis between an open position allowing the gas to flow through the valve housing and a closed position preventing the gas from flowing through the valve housing. Furthermore, the closure member consists of a first disk and a complementary second disk which abut against each other. The first disk and the second disk are symmetrically arranged with regard to a symmetric axis extending at the predetermined angle of inclination to the rotation axis.

It is one of the remarkable features of the butterfly valve according to the present invention that the closure member consists of two disks arranged symmetrically and abutting against each other. In this way, the cross-sectional area of the valve housing is restricted by one of the disks even if breaking of the other disk occurs. For this purpose, it has been discovered that a symmetrical configuration of the disks allowing a symmetric arrangement regarding the symmetric axis leads to a divided design of the closure member which enables a relatively easy mounting of the closure member without additional fastening means. Furthermore, the inclination between the symmetric axis of the disks and the rotation axis of the shaft allows to use a sealing element configured as one piece and adapted to seal the closure member within the valve housing without interruption.

In accordance with a preferred embodiment of the present invention, the first disk and the second disk comprise each an inner surface, an outer surface, a distal end having a first thickness between the inner surface and the outer surface, and a proximal end having a second thickness between the inner surface and the outer surface, wherein the first thickness is greater than the second thickness. In this way, the first disk and the second disk have a substantially wedge-shaped design which ensures a comparatively thin total thickness of the closure member, if the first disk and the second disk overlap in the direction of the longitudinal axis of the valve housing. Hence, a compact design of the butterfly valve can be achieved.

Preferably, the first disk and the second disk comprise each at least one contact face abutting against a corresponding contact face of the respective other disk. Providing of a contact face ensures a precise symmetrical arrangement of the first and second disk.

Further in accordance with a preferred embodiment of the present invention, the contact face extends from the proximal end towards the distal end covering between about 10% and about 90%, preferably about 50%, of the inner surface along a vertical axis extending orthogonal to the longitudinal axis of the valve housing. Since the first and second disk overlap along the contact face, such a configuration of the contact face ensures that if one of the disks is broken, the other disk still covers between about 50% and about 90% of the cross-sectional area of the valve housing, thereby reliably preventing the cabin of an aircraft from a detrimental loss of pressure. In this connection, it has been proved to be of exceptional advantage, if the contact face covers about half of the inner surface. In this case, each of the disks sufficiently closes two-third of the cross-sectional area of the valve housing, if the respective other disk is broken. Moreover, the overlapping of the first and second disk is in this case enough to ensure a solid mounting of the closure member on the one hand and a safe removal of the broken disk without affecting the function of the intact disk on the other hand.

According to another preferred embodiment of the present invention, the contact face comprises a main portion extending parallel to the symmetric axis and a first supplementary portion extending from an upper end of the main portion to the inner surface at a first angle. The first supplementary portion increases the extension of the contact face. Since the supplementary portion extends at the first angle to the main portion, there is an effective positive locking between the first disk and the second disk.

The positive locking between the first disk and the second disk can further be enhanced by a contact face additionally comprising a second supplementary portion extending from a lower end of the main portion to the outer surface at a second angle. Since the first disk and the second disk are configured symmetrically, the first angle and the second angle have the same extent, but are orientated opposite in the mounted condition of the closure member. Preferably, both the first angle between the main portion and the first supplementary portion and the second angle between the main portion and the second supplementary portion are less than about 90°, thereby giving the contact face a substantially Z-shaped contour and ensuring a reliable positive locking.

Furthermore, in accordance with a preferred embodiment of the present invention, the main portion extends along the vertical axis. In this way, the symmetric axis and the vertical axis coincide having the consequence that the rotation axis of the shaft is inclined to the vertical axis at the angle of inclination. The main portion of the contact face extends in this way in the seating plane of the closure member. The forces exerted on the first and second disk and resulting from the gas flow in the valve housing, thereby, support an abutting arrangement of the first and second disk.

In line with another preferred embodiment of the present invention, the first disk and the second disk comprise each an opening, wherein these openings are in alignment and accommodate the shaft. The openings allow the shaft to get through the closure member and, therefore, ensure an easy assembly and a robust mounting of the closure member.

Preferably, each opening extends at the angle of inclination to the main portion of the contact face. In this way, the axis of the opening coincides with the rotation axis of the shaft.

With regard to a fast and easy assembly of the closure member, the shaft is preferably secured in the openings by positive locking. The closure member, thereby, consists only of the first and second disk and the shaft. Additional fastening means, such as non-positive joining elements or screws, are not required for fastening the individual components of the closure member. However, this does not preclude such fastening means from being used for provisional fixing of the individual components of the closure member during assembly, if necessary.

In accordance with a preferred embodiment of the present invention, the shaft is configured as splined shaft. This means that an inner surface of the openings of the first and second disk is provided with an outline corresponding to the splined shaft. In this way, a reliable positive locking between the shaft and the first and second disk is achieved.

Finally, in accordance with a preferred embodiment of the present invention, the angle of inclination is less than about 15°, preferably between about 5° and about 10°. A butterfly valve having such an angle of inclination has been proved to be favourable regarding controlling of the air pressure inside the cabin of an aircraft.

BRIEF DESCRIPTION OF THE DRAWINGS

The various features and advantages of the present invention may be more readily understood with reference to the following detailed description taken in conjunction with the accompanying drawings, wherein like reference numerals designate like parts, and in which:

FIG. 5b is an enlarged illustration showing a detail designated by Vb in FIG. 5a;

FIG. 6b is a cross-sectional view of the closure member according to FIG. 6a;

FIG. 7 is a plan view showing a part of the closure member according to FIG. 6a.

DETAILED DESCRIPTION OF THE INVENTION

Figure 1A:
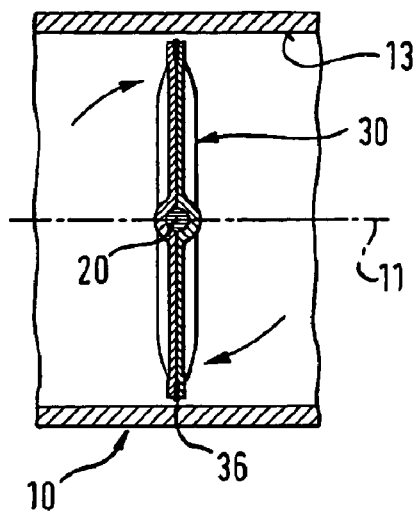
FIG. 1a is a cross-sectional view of a butterfly valve showing a closed position of a closure member.
Figure 1B:
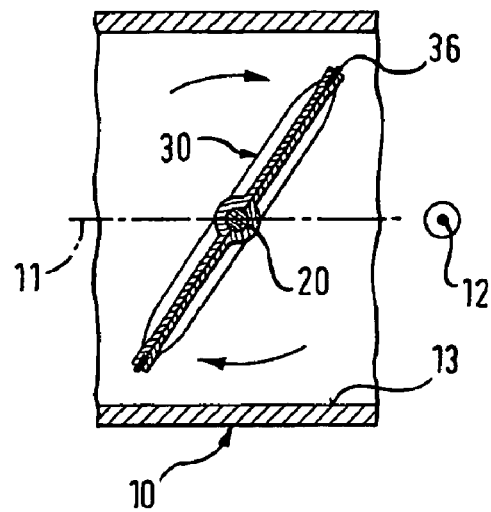
FIG. 1b is a cross-sectional view according to FIG. 1a showing an open position of the closure member.

The butterfly valve as shown in FIGS. 1a and 1b comprises a valve housing 10 which has a longitudinal axis 11 and defines a flow path along the longitudinal axis 11 for air flowing out of the cabin of an aircraft. The butterfly valve further comprises a closure member 30 or flap which is pivotally mounted in the valve housing 10 and connected to a shaft 20 having a rotation axis 21 and driven by an actuator, for example an electric motor. In this way, the closure member 30 is pivotable between an open position showing in FIG. 1b, which allows the air to flow through the valve housing 10, and a closed position showing in FIG. 1a, which prevents the air from flowing through the valve housing 10.

Commercial aircrafts are equipped with such a butterfly valve for controlling the air pressure inside the cabin. During the flight of an aircraft, variations in aircraft altitude cause rapid changes in ambient pressure. The butterfly valve typically controlled by a cabin pressure control system serves to maintain the air pressure inside the cabin at a relatively comfortable level by regulating the outflow of cabin air out of the butterfly valve. The flow of cabin air depends on the position of the closure member 30. In the closed position, as shown in FIG. 1a, the closure member 30 sealingly engages a wall 13 of the valve housing 10 to shut the flow of air therein. To this end, the periphery of the closure member 30 is provided with a sealing element 36 which co-operates with the wall 13. The sealing element 36 is arranged in a circumferential groove 35, as can be better seen in FIGS. 4a and 4b. A spring element 38 arranged in the groove 35 applies a predetermined prestress to the sealing element 36, thereby ensuring a tight fitting of the closure member 30 within the valve housing 10.

Figure 2:
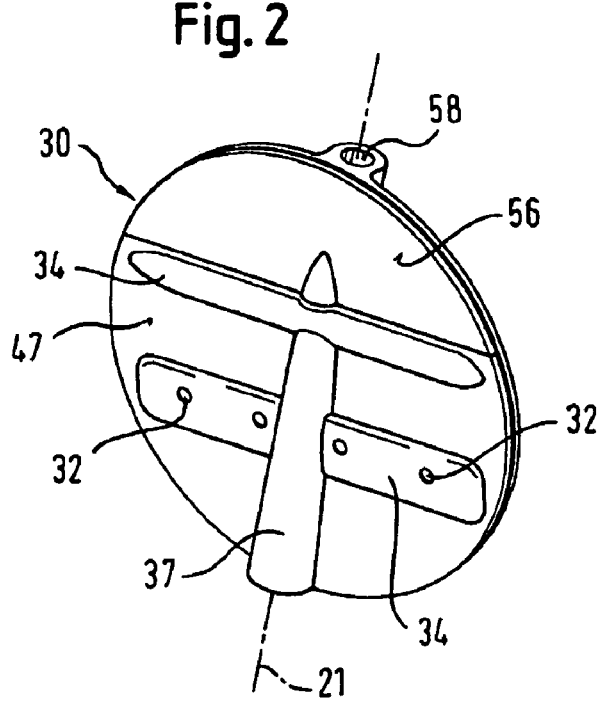
FIG. 2 is a perspective view showing the closure member according to FIGS. 1a and 1b.

The closure member 30 consists of a first disk 40 and a complementary second disk 50 which abut against each other. The first disk 40 and the second disk 50 comprise inner surfaces 46, 56 facing each other and outer surfaces 47, 57. As shown in FIG. 2, the outer surfaces 47 and 57 are provided with reinforcing ribs 34 and a passageway 37 defining through holes 48, 58 which are in alignment and accommodate the shaft 20.

Figure 6A:
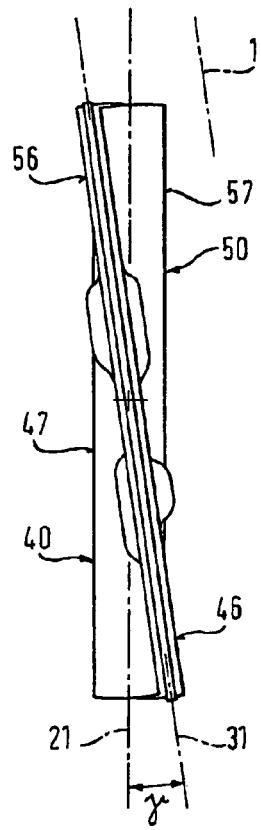
FIG. 6a is a side view of the closure member according to FIG. 3.
Figure 6B:
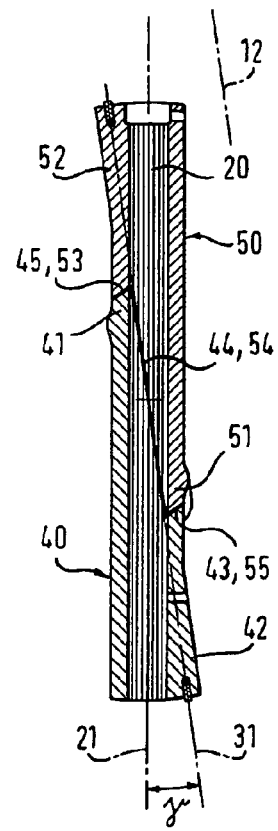
Figure 5B:
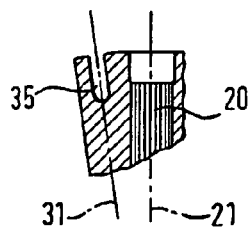
Figure 7:
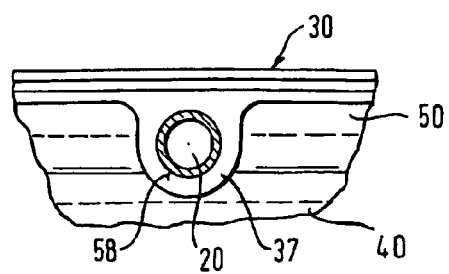

Furthermore, the first disk 40 and the second disk 50 configured identically comprise each a distal end 41, 51 and a proximal end 42, 52, as depicted in FIG. 6b. The distal end 41, 51 of the first and second disks 40, 50 has a first thickness between the inner surface 46, 56 and the outer surface 47, 57 which is greater than a second thickness between the inner surface 46, 56 and the outer surface 47, 57 of the proximal end 42, 52. In this way, the first disk 40 and the second disk 50 have a substantially wedge-shaped design.

Figure 5A:
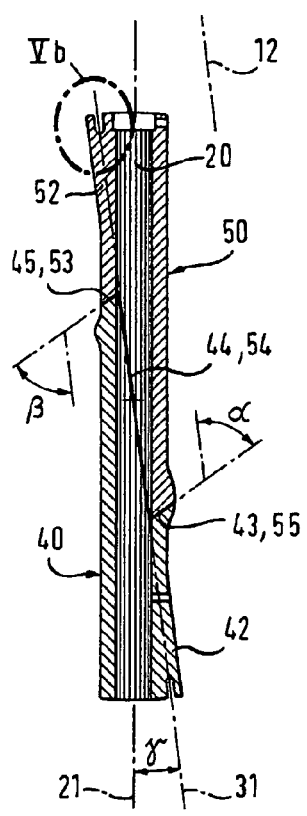
FIG. 5a is a sectional view according to line Va—Va in FIG. 3.

FIGS. 5a and 6b show that the first disk 40 and the second disk 50 comprise each a contact face 43 to 45; 53 to 55 which extends from the proximal end 42, 52 towards the distal end 41, 51, thereby, covering about 50% of the inner surface 46, 56 along a vertical axis 12 which extends orthogonal to the longitudinal axis 11 of the valve housing 10. The contact face comprises a main portion 44, 54 extending parallel to a symmetric axis 31. The contact face further comprises a first supplementary portion 43, 53 extending from an upper end of the main portion 44, 54 to the inner surface 46, 56 at a first angle α and a second supplementary portion 45, 55 extending from a lower end of the main portion 44, 54 to the outer surface 47, 57 at a second angle β, as shown in FIG. 5a. The first disk 40 and the second disk 50 are symmetrically arranged with regard to the symmetric axis 31 such that the main portion 44, the first supplementary portion 43, and the second supplementary portion 45 of the first disk 40 abut against the corresponding main portion 54, the first supplementary portion 53 and second supplementary portion 55 of the second disk 50. The first angle α between the main portion 44, 54 and the first supplementary portion 43, 53 and the second angle β between the main portion 44, 54 and the second supplementary portion 45, 55 are both of the same extent due to the symmetric design of the first disk 40 and the second disk 50. Preferably, the first angle α and the second angle β are both less than 90°, thereby, giving the contact face 43 to 45, 53 to 55 a substantially Z-shaped contour. Such a contour of the contact face 43 to 45, 53 to 55 ensures a reliable positive locking between the first disk 40 and the second disk 50.

The stability of the closure member 30 is further increased by a positive locking between the shaft 20 and the first disk 40 and the second disk 50. As shown in FIGS. 3 to 7, the shaft 20 is configured as splined shaft having splines which engage corresponding recesses of the through holes 48, 58. Additional fastening means for connecting the first disk 40 to the second disk 50 are basically not necessary. However, as shown in FIGS. 2 to 5a, the reinforcing ribs 34 are provided with bores 32 which accommodate screws 33. These screws 33, preferably made of light metal, such as aluminium, merely serve for provisional fixing and aligning of the first and second disks 40, 50 before introducing the shaft 20 into the through holes 48, 58. After assembly of the closure member 30, the screws 33 are only required to close the bores 32, thereby avoiding the generation of noise.

Figure 3:
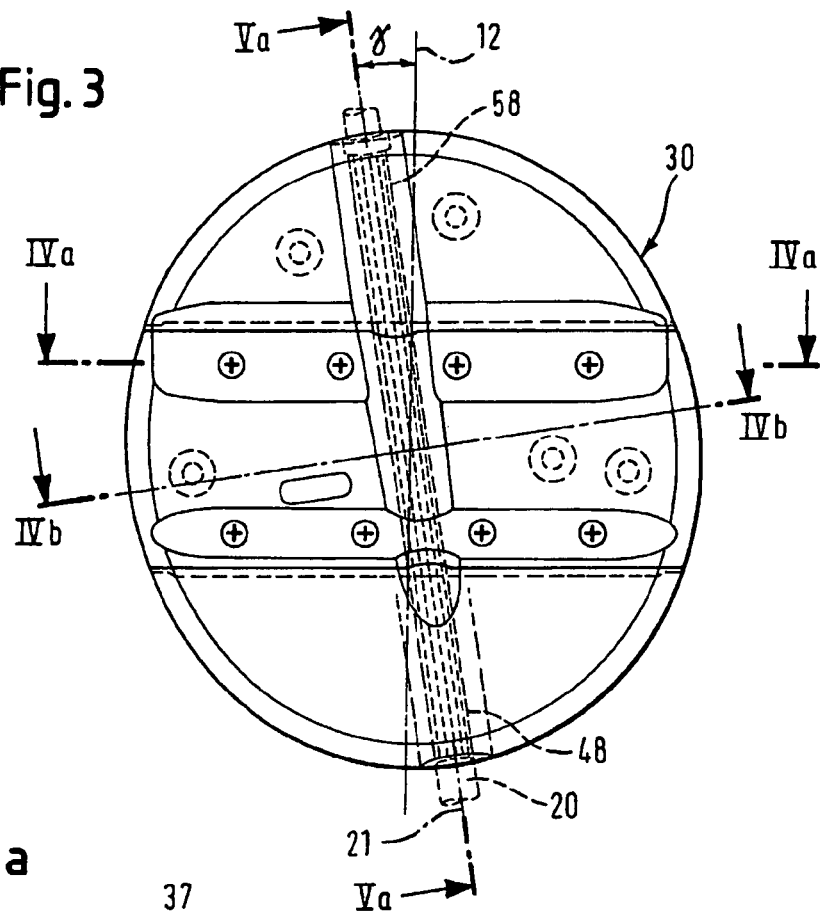
FIG. 3 is a side view of the closure member according to FIG. 2 connected with a shaft.
Figure 4A:
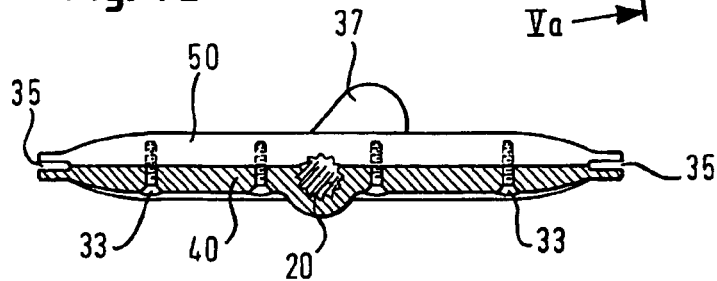
FIG. 4a is a sectional view according to line IVa—IVa in FIG. 3.
Figure 4B:
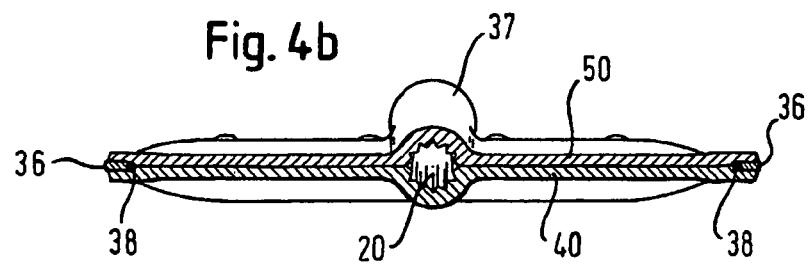
FIG. 4b is a sectional view according to line IVb—IVb in FIG. 3.

Especially FIGS. 5a to 6b show that the symmetric axis 31 extends at a predetermined angle of inclination β to the rotation axis 21 of the shaft 20. The angle of inclination γ is typically less than about 15°, in the preferred embodiment shown in FIGS. 5a to 6b about 8°. The axes of the through holes 48, 58 coincide with the rotation axis 21 and, therefore, are inclined to the symmetric axis 31 at the angle of inclination γ as well. The inclination between the symmetric axis 31 and the rotation axis 21 results in an inherent stability of the closure member 30. This inherent stability is increased by the arrangement of the main portion 44, 54 in the seating plane of the closure member 30. This means that the main portion 44, 54 extends along the vertical axis 12 which is orthogonal to the longitudinal axis 11'. The rotation axis 21, thereby, extends at the angle of inclination γ to the vertical axis 12, as shown in FIG. 3. For this reason, the passageway 37 gradually comes out of the outer surface 47, 57, as depicted in FIGS. 4a, 4b. Since the main portion 44, 54 of the contact face extends in the seating plane of the closure member 30, the forces exerted on the first and second disk 40, 50 and resulting from the air flowing through the valve housing 10 support the abutting arrangement of the first and second disk 40, 50.

The above-described butterfly valve is distinguished by an easy assembly due to the limited number of components of the closure member 30. Furthermore, the closure member 30 has the advantage of being self-stabilizing with regard to the positive locking of the first and second disks 40, 50 and the shaft 20. Last but not least, the butterfly valve ensures a restricted cross-sectional area of the valve housing 10, if breaking of the closure member 30 occurs. The reason for this is the divided design of the closure member 30 as a result of the symmetric arrangement of the first and second disks 40, 50 with regard to the symmetric axis 31.

| List of reference signs |
| --- |
| 10 valve housing |
| 11 longitudinal axis |
| 12 vertical axis |
| 13 wall |
| 20 splined shaft |
| 21 rotation axis |
| 30 closure member |
| 31 symmetric axis |
| 32 bore |
| 33 screw |
| 34 reinforcing rib |
| 35 circumferential groove |
| 36 sealing element |
| 37 passageway |
| 38 spring element |
| 40 first disk |
| 41 distal end |
| 42 proximal end |
| 43 first supplementary portion |
| 44 main portion |
| 45 second supplementary portion |
| 46 inner surface |
| 47 outer surface |
| 48 through hole |
| 50 second disk |
| 51 distal end |
| 52 proximal end 52 |
| 53 first supplementary portion |
| 54 main portion |
| 55 second supplementary portion |
| 56 inner surface |
| 57 outer surface |
| 58 through hole |
| α first angle |
| β second angle |
| γ angle of inclination |

The invention claimed is:
1. A butterfly valve for controlling a gas pressure, comprising:
a valve housing having a longitudinal axis and defining a flow path for a gas along the longitudinal axis;
a shaft having a rotation axis;
a closure member connected to the shaft;
the closure member being pivotally mounted in the valve housing for rotation about the rotation axis between an open position allowing the gas to flow through the valve housing and a closed position preventing the gas from flowing through the valve housing;
the closure member consisting of a first disk and a complementary second disk which abut against each other, the first disk and the second disk being symmetrically arranged with regard to a symmetric axis extending at a predetermined angle of inclination (γ) to the rotation axis;
the first disk and the second disk comprising each an inner surface, an outer surface, and at least one contact face abutting against a corresponding contact face of the respective other disk; and
the contact face comprising a main portion extending parallel to the symmetric axis and at least one supplementary portion extending from an end of the main portion to the inner surface or the outer surface at a predetermined angle ($\alpha$, $\beta$).

2. The butterfly valve according to claim 1, wherein the first disk and the second disk comprise each a distal end having a first thickness between the inner surface and the outer surface, and a proximal end having a second thickness between the inner surface and the outer surface, the first thickness being greater than the second thickness.

3. The butterfly valve according to claim 2, wherein the contact face extends from the proximal end towards the distal end covering between about 10% and about 90%, of the inner surface along a vertical axis extending orthogonal to the longitudinal axis of the valve housing.

4. The butterfly valve according to claim 1, wherein the contact face comprises a first supplementary portion extending from an upper end of the main portion to the inner surface at a first angle ($\alpha$) and a second supplementary portion extending from a lower end of the main portion to the outer surface at a second angle ($\beta$).

5. The butterfly valve according to claim 4, wherein the first angle ($\alpha$) between the main portion; and the first supplementary portion is less than about 90°.

6. The butterfly valve according to claim 4, wherein the second angle ($\beta$) between the main portion and the second supplementary portion is less than about 90°.

7. The butterfly valve according to any of the claim 1, characterized in that wherein the main portion extends along the vertical axis.

8. The butterfly valve according to claim 1, wherein the first disk and the second disk comprise each comprise an opening, the openings being in alignment and accommodating the shaft.

9. The butterfly valve according to claim 8, wherein the opening extends at the angle of inclination ($\gamma$) to the main portion of the contact face.

10. The butterfly valve according to claim 8, wherein the shaft is secured in the openings by positive locking.

11. The butterfly valve according to claim 10, wherein the shaft is configured as a splined shaft.

12. The butterfly valve according to claim 1, wherein the angle of inclination ($\gamma$) is less than about 15°.

13. The butterfly according to claim 3, wherein the contact face extends from the proximal end towards the distal end covering about 50% of the inner surface along the vertical axis extending orthogonal to the longitudinal axis of the valve housing.

14. The butterfly valve according to claim 12, wherein the angle of inclination ($\gamma$) is between about 5° and about 10°.

* * * * *